United States Patent
Valder et al.

(10) Patent No.: US 11,487,274 B2
(45) Date of Patent: Nov. 1, 2022

(54) CLOUD-BASED BUILDING MANAGEMENT SYSTEM

(71) Applicant: Honeywell International Inc., Morris Plains, NJ (US)

(72) Inventors: Roshan Valder, Bengaluru (IN); Manu Taranath, Bangalore (IN); Agniraj Chatterji, Kolkata (IN); David Trice, Roswell, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 259 days.

(21) Appl. No.: 16/888,625

(22) Filed: May 29, 2020

(65) Prior Publication Data
US 2021/0373541 A1     Dec. 2, 2021

(51) Int. Cl.
G05B 23/02     (2006.01)

(52) U.S. Cl.
CPC ..... *G05B 23/0213* (2013.01); *G05B 23/0232* (2013.01); *G05B 23/0235* (2013.01); *G05B 2223/06* (2018.08)

(58) Field of Classification Search
CPC ....... H04L 67/12; H04L 67/125; H04L 67/34; H04L 12/2803; H04L 12/28; H04L 12/2818; G05B 23/0213; G05B 23/0232; G05B 23/0235; G05B 15/02; G05B 2223/06; G05B 2219/25011
USPC ........................................................ 702/188
See application file for complete search history.

(56) References Cited

U.S. PATENT DOCUMENTS

| | | | |
|---|---|---|---|
| 7,240,106 B2 | 7/2007 | Cochran et al. |
| 8,290,627 B2 | 10/2012 | Richards et al. |
| 9,128,472 B2 | 9/2015 | Lawson et al. |
| 9,253,054 B2 | 2/2016 | Maturana et al. |
| 9,363,336 B2 | 6/2016 | Lawson et al. |
| 9,413,852 B2 | 8/2016 | Lawson et al. |
| 9,477,936 B2 | 10/2016 | Lawson et al. |
| 9,535,411 B2 | 1/2017 | Wei et al. |
| 9,565,275 B2 | 2/2017 | Lawson et al. |
| 9,568,908 B2 | 2/2017 | Lawson et al. |
| 9,568,909 B2 | 2/2017 | Lawson et al. |

(Continued)

FOREIGN PATENT DOCUMENTS

| | | |
|---|---|---|
| CA | 2900767 A1 | 8/2014 |
| CN | 103679304 A | 3/2014 |

(Continued)

*Primary Examiner* — John H Le
(74) *Attorney, Agent, or Firm* — Seager, Tufte & Wickhem, LLP

(57) ABSTRACT

A method of remotely configuring one or more building system components at a building site uses a cloud-based server remote from the building site. The cloud-based server receives information from an intelligent gateway at the building site that identifies each of one or more building system components at the building site. The cloud-based server is used to create a site configuration that is based at least in part on the identified information for each of the one or more building system components. The site configuration is then downloaded from the cloud-based server to the intelligent gateway such that the intelligent gateway is able to pass configuration information to one or more local controllers that control operation of the one or more building system components.

20 Claims, 6 Drawing Sheets

(56) References Cited

U.S. PATENT DOCUMENTS

| | | | |
|---|---|---|---|
| 9,965,562 B2 | 5/2018 | Lawson et al. | |
| 10,095,207 B2 | 10/2018 | Ji et al. | |
| 10,116,532 B2 | 10/2018 | Lawson et al. | |
| 10,139,811 B2 | 11/2018 | Lawson et al. | |
| 10,401,810 B2 | 9/2019 | Guthrie et al. | |
| 10,443,357 B2 | 10/2019 | Weatherhead et al. | |
| 2013/0211870 A1 | 8/2013 | Lawson et al. | |
| 2013/0212214 A1 | 8/2013 | Lawson et al. | |
| 2014/0012950 A1 | 1/2014 | Doucette et al. | |
| 2014/0047107 A1* | 2/2014 | Maturana | G05B 15/02 709/224 |
| 2017/0223110 A1 | 8/2017 | Lawson et al. | |
| 2018/0253569 A1* | 9/2018 | Swierk | G06F 21/554 |
| 2018/0309818 A1* | 10/2018 | Park | H04L 41/12 |
| 2019/0014180 A1 | 1/2019 | Lawson et al. | |
| 2020/0003028 A1 | 1/2020 | Weatherhead et al. | |
| 2020/0167148 A1* | 5/2020 | Park | G06F 8/63 |

FOREIGN PATENT DOCUMENTS

| | | | |
|---|---|---|---|
| CN | 104969133 | A | 10/2015 |
| EP | 2660667 | A2 | 6/2013 |
| EP | 2954377 | A1 | 12/2015 |
| MX | 343533 | B | 11/2016 |
| WO | 2013133967 | A1 | 9/2013 |
| WO | 2014124353 | A1 | 8/2014 |
| WO | 2017213771 | A1 | 12/2017 |
| WO | 2018234741 | A1 | 12/2018 |

* cited by examiner

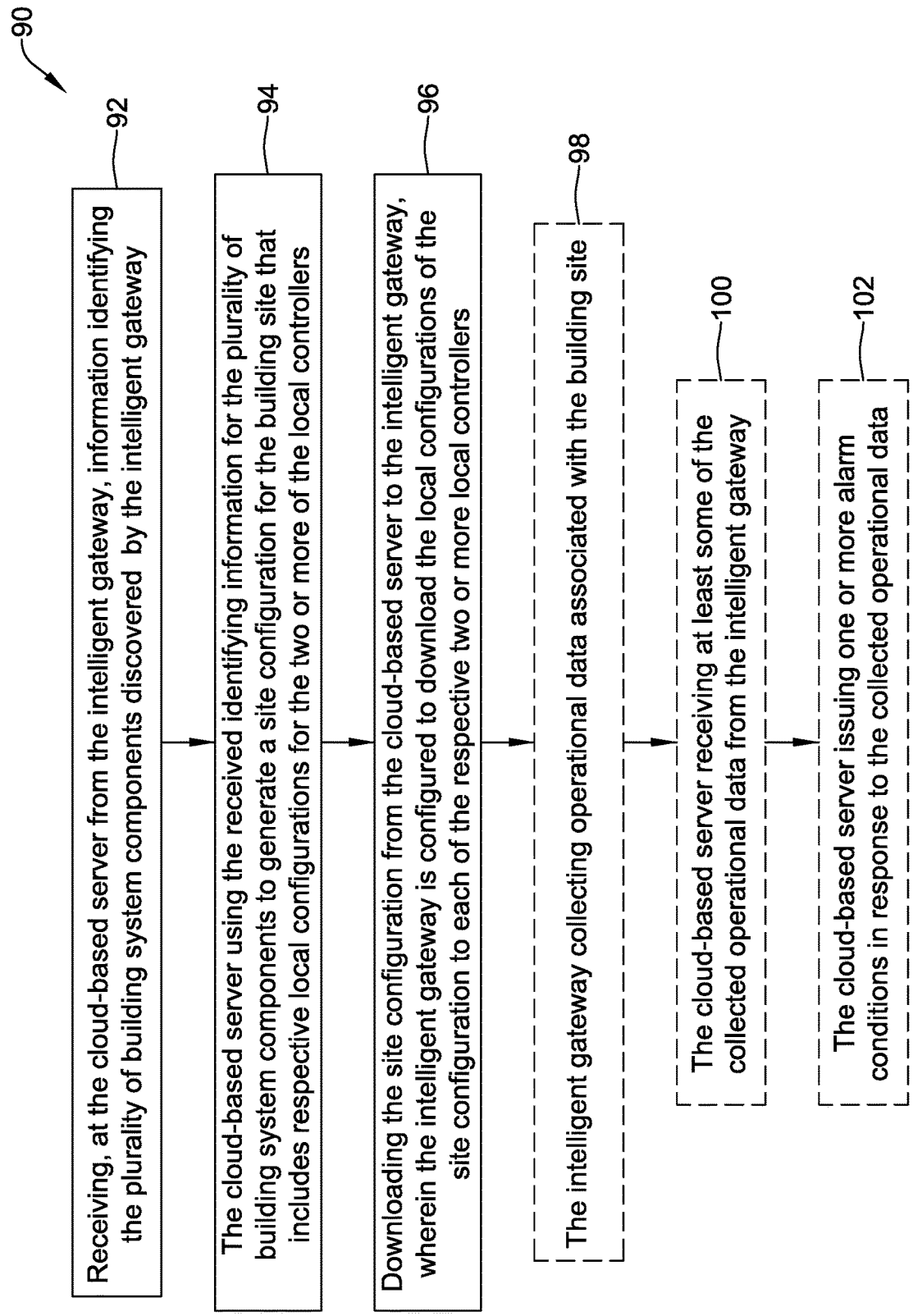

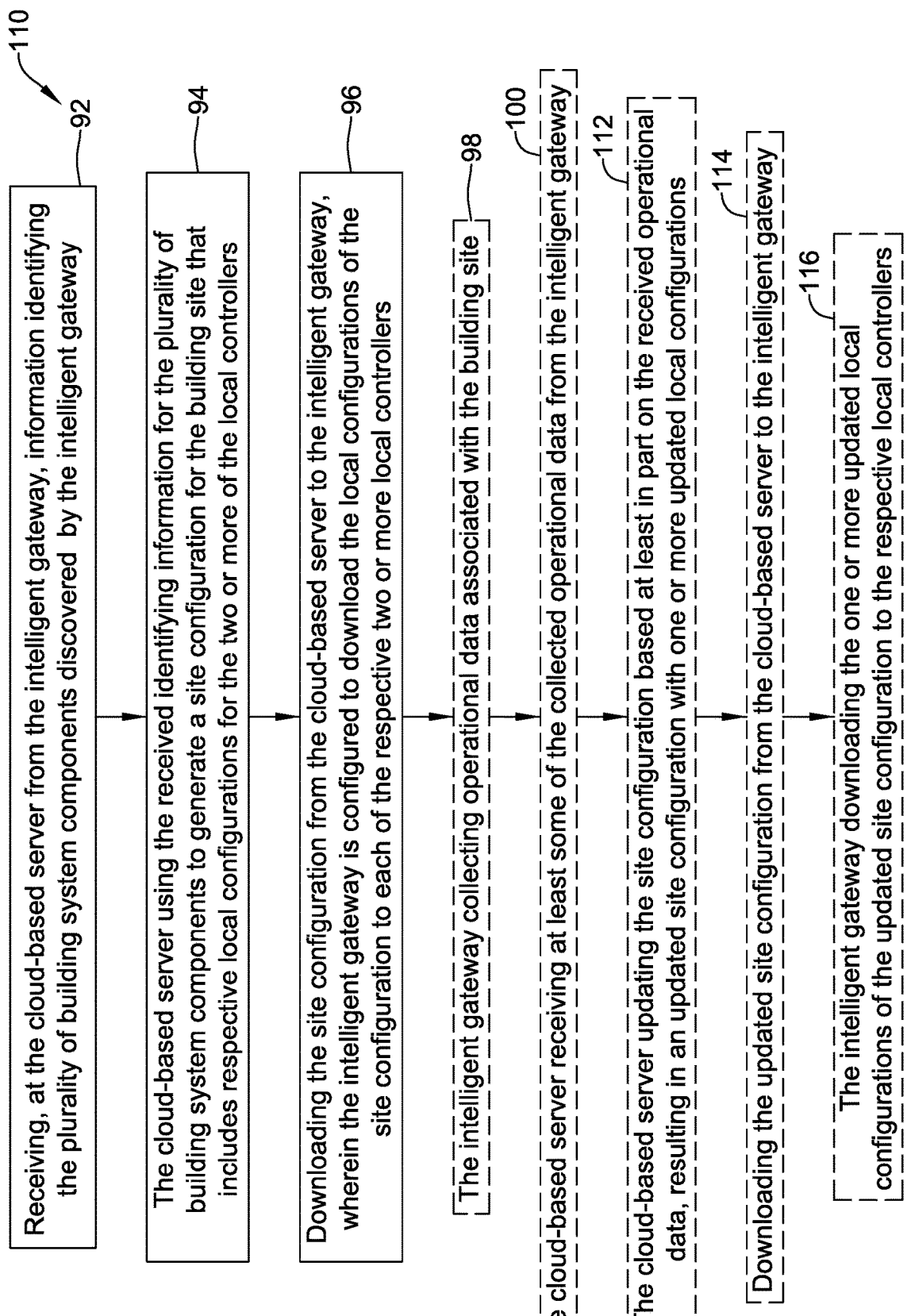

CLOUD-BASED BUILDING MANAGEMENT SYSTEM

TECHNICAL FIELD

The present disclosure relates generally to building management systems. More particularly, the present disclosure relates to cloud-based building management systems.

BACKGROUND

Building management systems may be used to control operations of a variety of different building management system components. In many cases, a building management system includes a centralized supervisory building management system controller that is used to control the overall building management system at the building site. Configuring and/or managing such systems from a remote site can be a challenge. What would be desirable is a cloud-based building management system that is easier to configure and/or manage from a remote location.

SUMMARY

The present disclosure relates generally to cloud-based building management systems. In one example, a method of remotely configuring one or more building system components at a building site uses a cloud-based server remote from the building site. One or more building system components are operably coupled with an intelligent gateway that is disposed at the building site and is itself operably coupled with the cloud-based server via a network. The intelligent gateway may discover the one or more building components. The cloud-based server then receives information from the intelligent gateway that identifies each of the one or more building system components. The cloud-based server is used to create a site configuration that is based at least in part on the identified information for each of the one or more building system components. The site configuration is then downloaded from the cloud-based server to the intelligent gateway, and the intelligent gateway passes configuration information to one or more local controllers that control operation of the one or more building system components.

In another example, a method of providing a cloud-based building management system for a building that does not have a centralized supervisory building management system controller at the building site includes providing an intelligent gateway at the building site that is configured to communication with one or more building system components that are operably coupled with a local network at the building site. A cloud-based building management system is provided that communicates with the intelligent gateway at the building site. The cloud-based building management system may include a site configuration tool. Communication is enabled between the intelligent gateway and the cloud-based building management system and is enabled between the cloud-based building management system and one or more local controllers of the building control components via the intelligent gateway. Real time operating data that is collected by the intelligent gateway from one or more of the building system components at the building site is received from the intelligent gateway by the cloud-based building management system. In response, updated operational instructions, for distribution to one or more of the local controllers, is provided to the intelligent gateway. The updated operational instructions modify operation of one or more of the building system components in response to the real time operating data.

In another example, a non-transitory, computer-readable storage medium has stored thereon executable instructions. When the executable instructions are executed by one or more processors of a cloud-based server, the one or more processors of the cloud-based server are caused to receive, at the cloud-based server from an intelligent gateway that is located at a building site remote from the cloud-based server, information identifying each of the one or more building system components at the building site along with operational data for at least some of the one or more building system components. The one or more processors of the cloud-based system are caused to generate a site configuration, store the site configuration on the cloud-based server, and download the site configuration to the intelligent gateway, wherein the intelligent gateway is configured to pass configuration information to one or more local controllers that control operation of at least some of the one or more building system components. The one or more processors of the cloud-based system are caused to subsequently make changes to the site configuration residing on the cloud-based server and to update the site configuration stored on the intelligent gateway, wherein the intelligent gateway is configured to automatically pass configuration updates to one or more local controllers.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 5 is a flow diagram showing an illustrative method that may be carried out using the illustrative system of FIG. 1; and FIG. 6 is a flow diagram showing an illustrative method that may be carried out using the illustrative system of FIG. 1.

Figure 1:
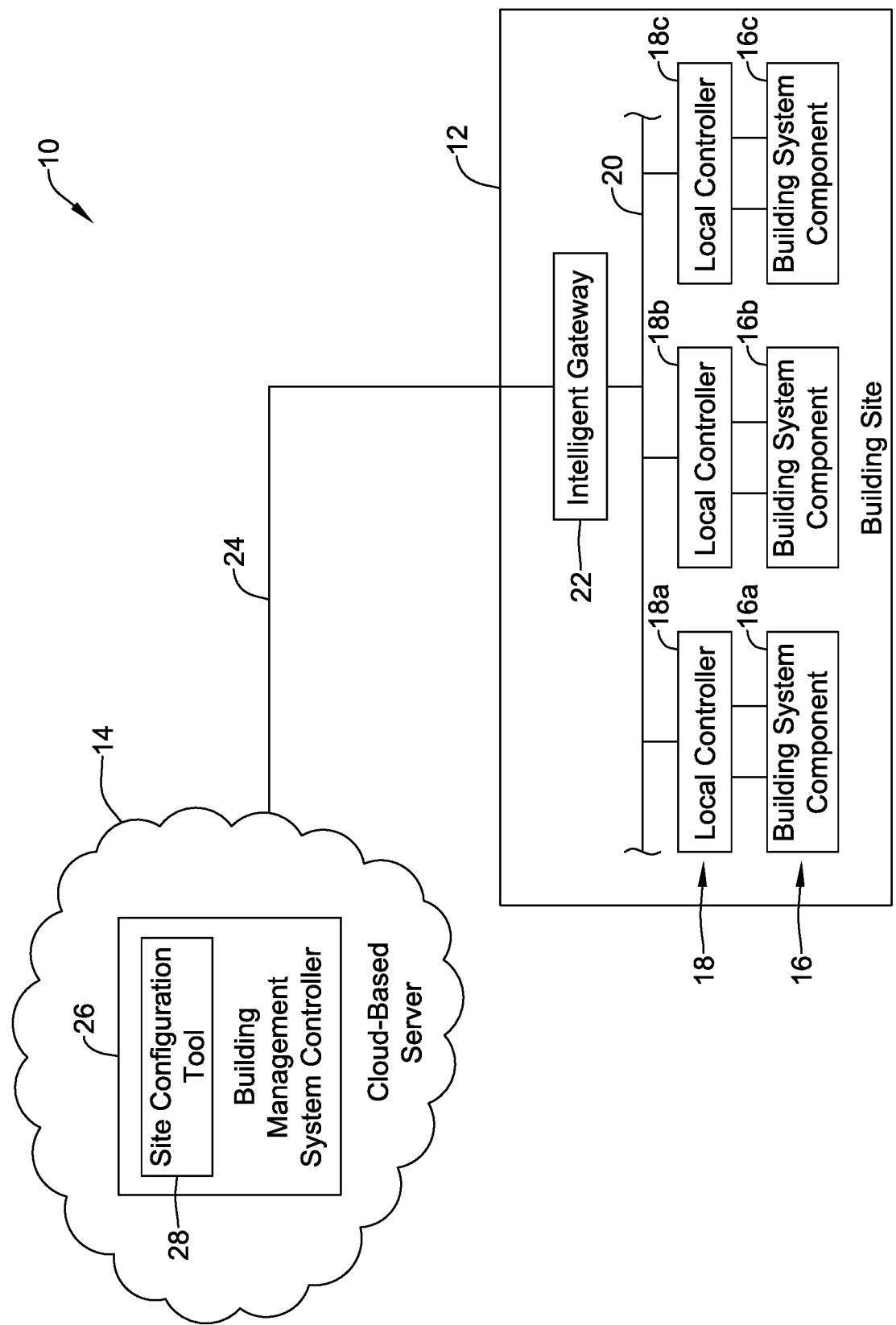
FIG. 1 is a schematic block diagram of an illustrative system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building system 10. In its broadest terms, the illustrative building system 10 includes a building site 12 and a cloud-based server 14. The building site 12 may generally represent any building or portion of a building. In some cases, the building site 12 may be considered as representing a building or portion of a building that does not separately have a centralized local supervisory building management system. The building site 12 includes a number of building system components 16 that are individually labeled as 16a, 16b and 16c. While a total of three building system components 16 are shown, it will be appreciated that this is merely illustrative, as the building site 12 may include any number of building system components 16. The building system components 16 may represent individual components within a Heating, Ventilating and Air Conditioning (HVAC) system, such as heating sources, cooling sources, ventilation sources, VAV boxes, air dampers and the like, for example. Some of the building system components 16 may represent individual components within a security system, such as security sensors, control pads and the like. Some of the building system components 16 may represent individual components within a lighting system, such as individual lighting sources. These are just examples.

The illustrative building site 12 includes a number of local controllers 18 that are individually labeled as 18a, 18b, 18c. The local controllers 18 may be used, for example, to control operation of the building system components 16. While a total of three local controllers 18 are shown, it will be appreciated that this is merely illustrative, as the building site 12 may include any number of local controllers 18. In an HVAC system, for example, a particular local controller 18 could control operation of a VAV box that is represented by one of the building system components 16. The local controller 18 for that particular building system component 16 may control the relative damper position within the VAV box in order to achieve a desired air flow, or perhaps to achieve a desired temperature set point, within a corresponding portion of the building site 12. While shown as having a one-to-one relationship between an individual building system component and a corresponding individual local controller 18, this is not necessarily true in all cases. For example, in some cases, a single local controller 18 could control operation of two or more different building system components 16.

In the example shown, each of the local controllers 18 are operably coupled with a local network 20. The local network 20 may be a hard-wired network, for example, or may in some cases be a wireless network or a combination of a hard-wired network and a wireless network. An intelligent gateway 22 may be operably coupled to the local network 20, and thus may be operably coupled to each of the local controllers 18 that are themselves operably coupled to the local network 20. In some cases, particularly if the building site 12 is relatively small, there may not be a local network 20. In such cases, each of the local controllers 18 may instead be directly coupled to the intelligent gateway 22 via a wired or wireless connection. In some cases, the local network 20 may operate in accordance with a network protocol, such as BACNET, MODBUS, LONTALK, ENOCEAN, ZIGBEE, X10 and/or any other suitable network protocol.

The intelligent gateway 22 functions as an intermediary between the local controllers 18 and the cloud-based server 14. For example, the intelligent gateway 22 may be configured to discover those devices on the local network 20. In some cases, the network protocol of the local network 20 includes discovery commands that, for example, may be used to request that all devices connected the local network 20 identify themselves. In some cases, the intelligent gateway 22 may interrogate any devices it finds operably coupled to the local network 20 to obtain additional information from those devices that further helps the intelligent gateway 22 and/or the cloud-based server 14 identify the connected devices, such as type of building system components, functionality of the identified building system components, connectivity of the local controllers and/or building system components, types of operational data that is available from the local controllers and/or building system components, types of alarms that are available from the local controllers and/or building system components, and/or any other suitable information.

The intelligent gateway 22 may pass some or all of this information up to the cloud-based server 14 via the network 24, which may use the information to create a site configuration for the building site 12. The site configuration may then be provided from the cloud-based server 14 to the intelligent gateway 22 via the network 24. The intelligent gateway 22 may be configured to provide appropriate local configurations to each of the local controllers 18 such that each of the local controllers 18 are best able to control operation of the building system component(s) 16 for which they are responsible. The intelligent gateway 22 may be configured to collection operational data regarding operation of the building system components 16 that is initially collected by the local controllers 18, and may be configured to provide the collected operational data to the cloud-based server 14.

In some cases, the local configuration for one of the local controllers 18 may include one or more of control logic, modeling and configuration settings for operation of the particular building system component that the local controller 18 is responsible for operating. The local configuration may represent an initial configuration (e.g. during initial commissioning of the building management system in the building site 12), or the local configuration may represent a subsequent modification of the original configuration.

The intelligent gateway 22 may be operably coupled to the cloud-based server 14 via a network 24. The network 24 may represent a single network, or a compilation of two or more distinct networks. The network 24 may include the Internet. The cloud-based server 14, which may represent a single computer server or a collection of computer servers, may function as a centralized building management system controller 26 for the building management system. In some cases, the centralized building management system controller 26 implemented by the cloud-based server 14 may be considered as a replacement for an onsite centralized building management system controller. The centralized building management system controller 26 may provide some or all of the functionality of an onsite centralized building management controller without requiring all of the hardware that would typically be associated with an onsite centralized building management system controller, such as a server, desktop or other computer hardware running centralized building management system software.

It is contemplated that the centralized building management system controller 26 may, for example, receive operational data from the intelligent gateway 22, and may provide corresponding operational commands to the intelligent gateway 22. The intelligent gateway 22 may receive operational data from the local controllers 18 and upload the operational data to the centralized building management system controller 26. The intelligent gateway 22 may receive the operational commands from the centralized building management system controller 26, and may forward the operational commands to the appropriate local controllers 18.

The cloud-based server 14 may also provide a site configuration tool 28. The site configuration tool 28 may be used by a user to configure one or more of the building site 12. In some cases, the user may be able to use the site configuration tool 28 to connect with the intelligent gateway 22 in order to configure connections between the local controllers 18 and the local controllers 18 and/or building system components 16. This may, for example, include specifying which local controller 18 is responsible for operations of which building system component 16. The user may utilize the site configuration tool 28 to configure connections between the local controllers 18 and additional components, such as but not limited to sensors and actuators.

In some cases, the site configuration tool 28 may be configured to enable the user to perform data modeling using operational data received from the building site 12. Data modeling may be performed in order to define, for example, spatial hierarchies, equipment models, entity models, relationships between spaces and connected entities, and relationships between connected entities. The site configuration tool 28 may be configured to enable the user to configure alarm limits on points, history collections and operational schedules for one or more of the local controllers 18. The site configuration tool 28 may also be configured to allow the user to name the local controllers 18 and/or building system components 16 with a user friendly name. For example, the user may supply a name that identifies the location and/or function of a local controller 18 and/or a building system component 16.

Figure 2:
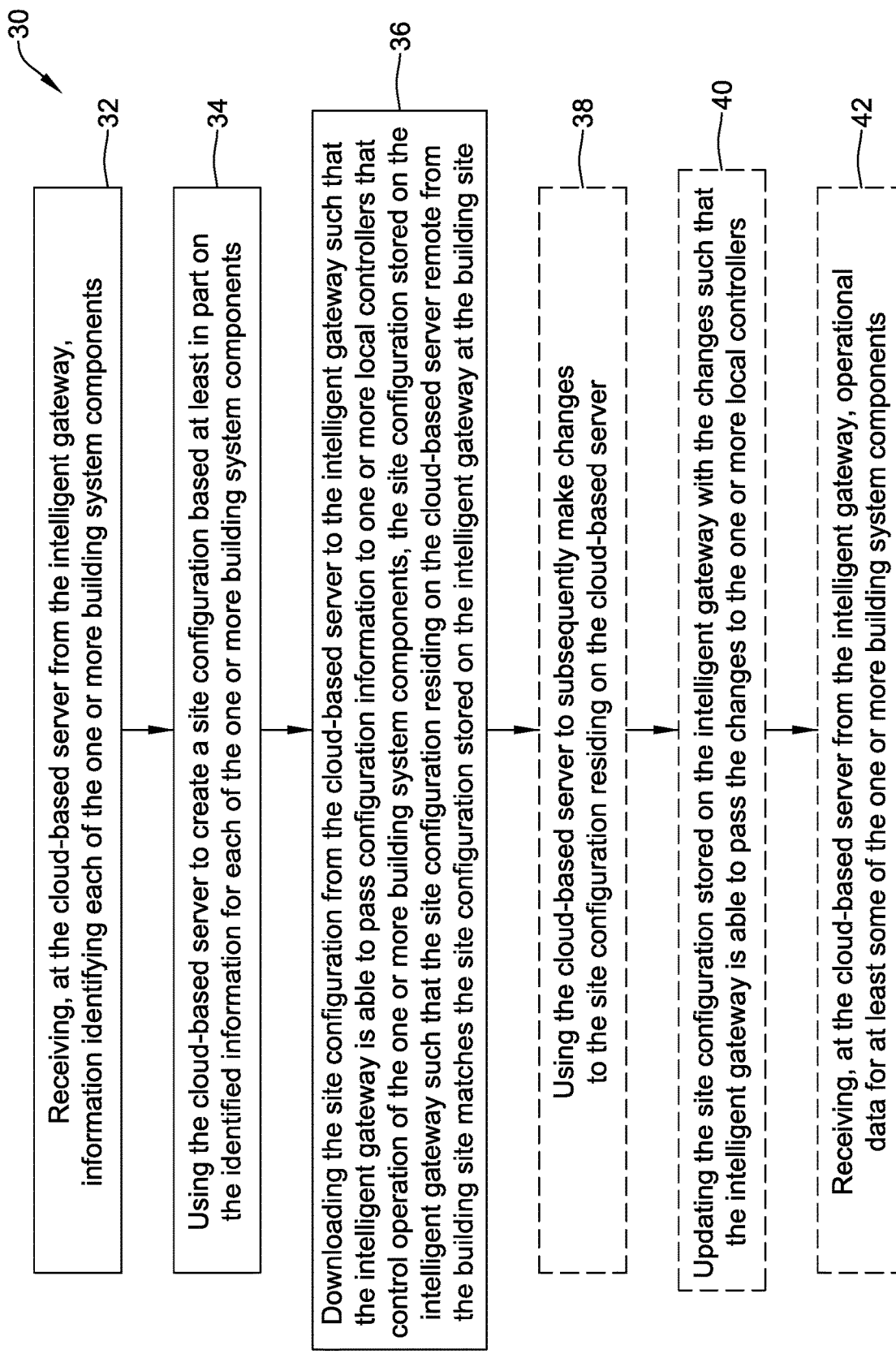
FIG. 2 is a flow diagram showing an illustrative method that may be carried out using the illustrative system of FIG. 1.

FIG. 2 is a flow diagram showing an illustrative method 30 of remotely configuring one or more building system components (such as the building system components 16) at a building site (such as the building site 12) using a cloud-based server (such as the cloud-based server 14) that is remote from the building site, where the one or more building system components are operably coupled with an intelligent gateway (such as the intelligent gateway 22) that is disposed at the building site that is itself operably coupled with the cloud-based server via a network (such as the network 24). Information identifying each of the one or more building system components may be received at the cloud-based server, as indicated at block 32. The information identifying each of the one or more building system components may be discovered by the intelligent gateway and provided to the cloud-based server.

The cloud-based server may be used to create a site configuration that is based at least in part on the identified information for each of the one or more building system components, as indicated at block 34. The site configuration may be downloaded from the cloud-based server to the intelligent gateway such that the intelligent gateway is able to pass configuration information to one or more local controllers that control operation of the one or more building system components.

In some cases, the site configuration is stored on the intelligent gateway such that the site configuration residing on the cloud-based server remote from the building site mirrors the site configuration stored on the intelligent gateway at the building site, as indicated at block 36. When the cloud-based server updated that site configuration stored on the cloud-based server, those updates may be automatically mirrored on the site configuration stored on the intelligent gateway.

In some cases, and as optionally indicated at block 38, the cloud-based server may be used to subsequently make changes to the site configuration that resides on the cloud-based server. The site configuration stored on the intelligent gateway may be updated with the changes such that the intelligent gateway is able to pass the changes to the one or more local controllers, as indicated at block 40.

In some instances, and as optionally indicated at block 42, operational data for at least some of the one or more building system components (sometimes from one or more of the local controllers) may be received from the intelligent gateway at the cloud-based server. The cloud-based server may issue one or more alarm conditions in response to the received operational data. The cloud-based server may, in some cases, generate one or more operational changes (e.g. control commands) in response to the received operational data, and the one or more generated operational changes may be downloaded to the intelligent gateway for distribution to and implementation by the one or more local controllers.

As indicated above, the cloud-based server may implement a site configuration tool for use by a user to help configure one or more of the local controllers and/or building system components when generating the site configuration. In some cases, the site configuration tool may be configured to permit the user to connect with the intelligent gateway in order to configure connections between each of the one or more local controllers and additional components. The site configuration tool may, in some cases, be further configured to permit the user to discover additional components operably coupled to a particular one of the one or more local controllers and to configure control logic that can be used by the particular one of the one or more local controllers to work with the additional components such as a sensor and/or an actuator.

In some cases, the site configuration tool may be configured to permit the user to perform data modeling using operational data for at least some of the one or more building system components received from the intelligent gateway in order to define, for example, one or more of spatial hierarchies, equipment models, entity models, relationships between spaces and connected entities, and relationships between connected entities. The site configuration tool may be configured to permit the user to configure one or more of alarm limits on points, history collections and operational schedules for one of the one or more local controllers. The site configuration tool may also be configured to allow the user to name the local controllers and/or building system components with a user friendly name. For example, the user may supply a name that identifies the location and/or function of a local controller and/or a building system component.

In some instances, the cloud-based server may be configured to download software to the intelligent gateway that, when executed by the intelligent gateway, enables the intelligent gateway to communicate with the one or more of the local controllers. The cloud-based server may be configured to bi-directionally communicate with the intelligent gateway. In some cases, the cloud-based server may maintain a mirror image of the site configuration between the cloud-based server and the intelligent gateway such that when a change is made to the site configuration on the cloud-based server, that change is automatically mirrored to the intelligent gateway. In some cases, the cloud-based server may maintain a mirror image of at least some operational data between the cloud-based server and the intelligent gateway such that when a change is made to the operational data collected by the intelligent gateway, that change is automatically mirrored to the cloud-based server and is make available for use by the cloud-based server.

Figure 3:
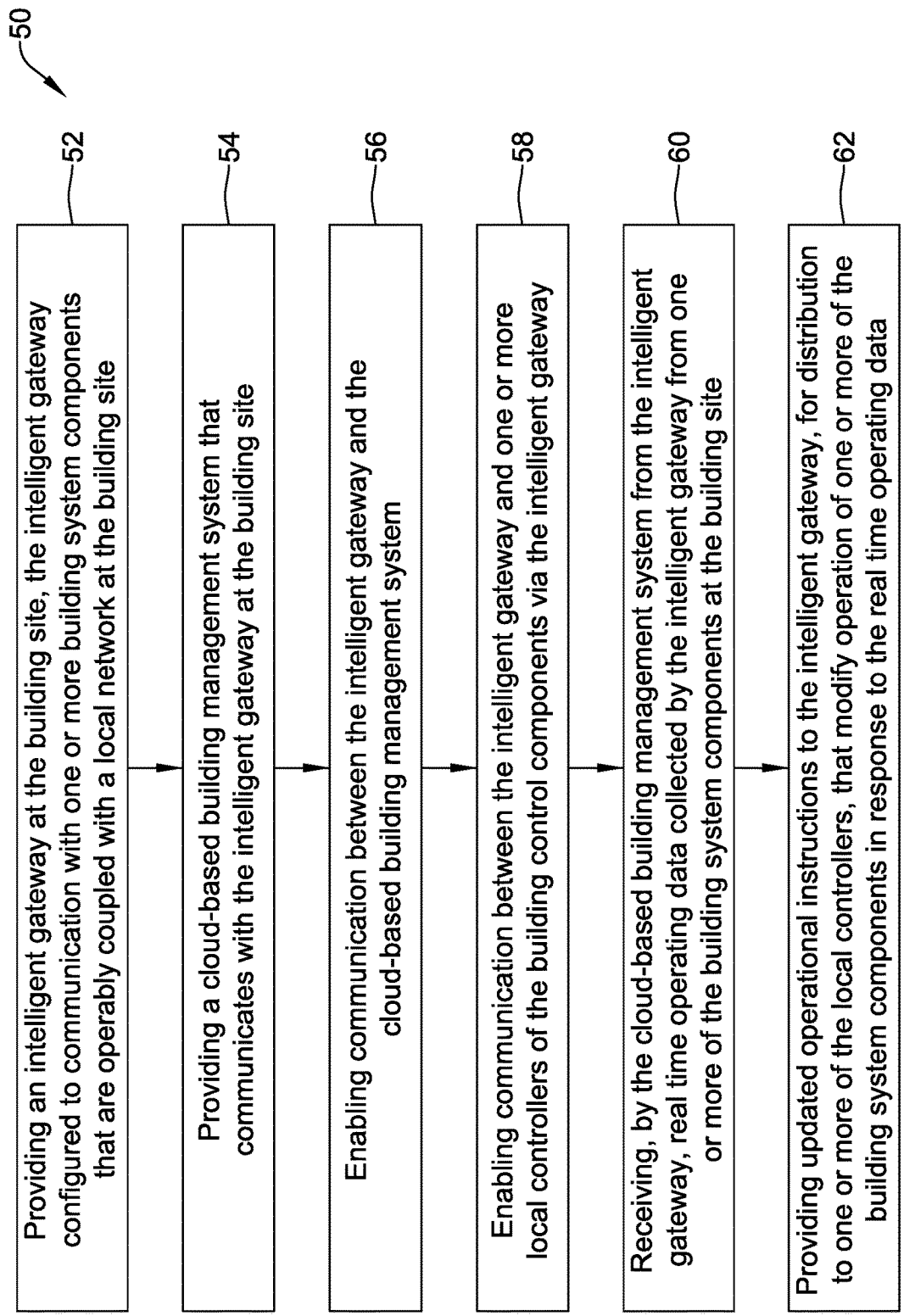
FIG. 3 is a flow diagram showing an illustrative method that may be carried out using the illustrative system of FIG. 1.

FIG. 3 is a flow diagram showing an illustrative method 50 of providing a cloud-based building management system for a building that does not have a centralized supervisory building management system controller at the building site. In the example show, an intelligent gateway is provided at the building site that is configured to communication with one or more building system components that are operably coupled with a local network at the building site, as indicated at block 52. A cloud-based building management system is provided that communicates with the intelligent gateway at the building site, as indicated at block 54. Communication is enabled between the intelligent gateway and the cloud-based building management system, as indicated at block 56. Communication is enabled between the cloud-based building management system and one or more local controllers of the building control components via the intelligent gateway, as indicated at block 58. Real time operating data from one or more of the building system components (and/or local controllers) at the building site is collected by the intelligent gateway and provided to the cloud-based building management system, as indicated at block 60. Updated operational instructions may be provided to the intelligent gateway from the cloud-based building management system, for distribution to one or more of the local controllers and/or building system components, that modify operation of one or more of the building system components in response to the real time operating data, as indicated at block 62.

In some instances, the cloud-based building management system may include a site configuration tool. The site configuration tool may be configured to permit a user to initially commission the cloud-based building management system for operation. The site configuration tool may be configured to enable a user to communicate with the intelligent gateway, and once in communication with the intelligent gateway, communicate with the local controllers via the intelligent gateway.

Figure 4:
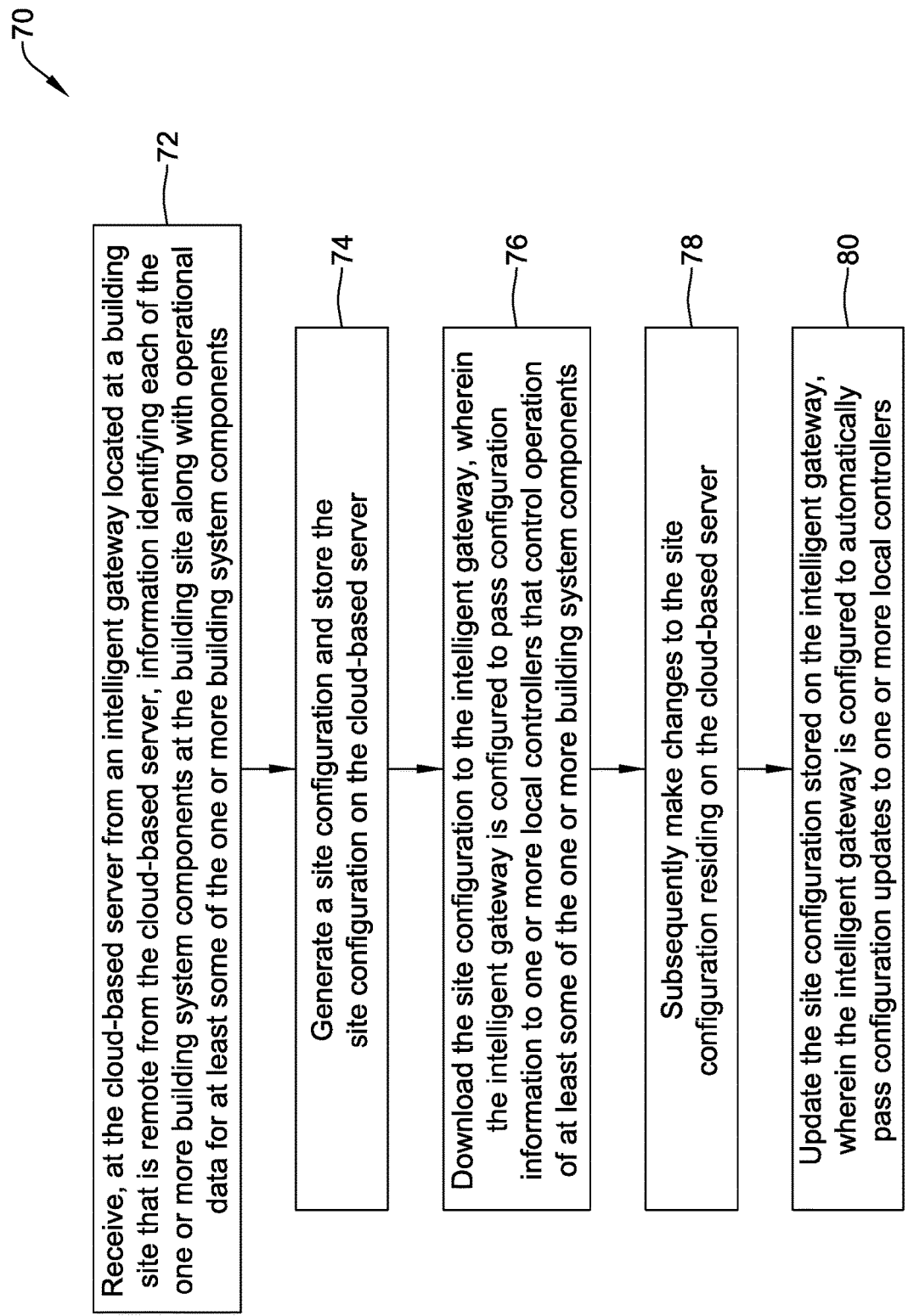
FIG. 4 is a flow diagram showing an illustrative method that may be carried out using the illustrative system of FIG. 1.

FIG. 4 is a flow diagram showing an illustrative method 70 that includes a step of receiving, at a cloud-based server from an intelligent gateway that is located at a building site remote from the cloud-based server, information identifying each of the one or more building system components at the building site along with operational data for at least some of the one or more building system components, as indicated at block 72. A site configuration may be generated and stored on the cloud-based server, as indicated at block 74. The site configuration may be downloaded to the intelligent gateway, wherein the intelligent gateway is configured to pass configuration information to one or more local controllers that control operation of at least some of the one or more building system components, as indicated at block 76. Changes may subsequently be made to the site configuration residing on the cloud-based server, as indicated at block 78. The site configuration stored on the intelligent gateway may be updated, wherein the intelligent gateway is configured to automatically pass configuration updates to one or more local controllers, as indicated at block 80. In some cases, the cloud-based server may provide a site configuration tool by which a user remote from the building site is able to originally commission the building site and/or make subsequent configuration changes to the building site.

FIG. 5 is a flow diagram showing an illustrative method 90 of remotely configuring a plurality of building system components at a building site. The plurality of building system components include a plurality of local controllers that are configured to control operation of the plurality of building system components that are operably coupled with an intelligent gateway disposed at the building site that is itself operably coupled with a cloud-based server via one or more networks. In some cases, the plurality of building system components are not controlled by a centralized local supervisory building management system controller located at the building site. In some instances, the intelligent gateway may be operatively coupled to the plurality of building system components with no intervening centralized supervisory building management system controller.

Information identifying the plurality of building system components discovered by the intelligent gateway is received at the cloud-based server, as indicated at block 92. The cloud-based server uses the received identifying information for the plurality of building system components to generate a site configuration for the building site that includes respective local configurations for two or more of the local controllers, as indicated at block 94. The site configuration is downloaded from the cloud-based server to the intelligent gateway, wherein the intelligent gateway is configured to download the local configurations of the site configuration to each of the respective two or more local controllers, as indicated at block 96.

In some instances, the site configuration defines one or more of control logic, modeling and configuration settings for the building site. In some instances, the site configuration is configured to originally commission the building site. Alternatively, or in addition, the site configuration may be configured to update a previously commissioned building site. The local configurations may define one or more of control logic, modeling and configuration settings for respective ones of the two or more local controllers.

In some cases, as optionally indicated at block 98, the intelligent gateway may collect operational data associated with the building site. This may include live-operational data. The cloud-based server may receive at least some of the collected operational data from the intelligent gateway, as optionally indicated at block 100. The cloud-based server may issue one or more alarm conditions in response to the collected operational data, as optionally indicated at block 102. In some cases, the cloud-based server may generate one or more changes to the site configuration in response to the received operational data, wherein the changes to the site configuration are implemented within the site configuration residing on the cloud-based server and are subsequently downloaded to the intelligent gateway for distribution to one or more local controllers.

In some instances, the cloud-based server may maintain a model, a schedule and an event log, and the intelligent gateway may maintain a model, a schedule and an event log. The event log may log events received from the plurality of local controllers. Changes to the model and/or the schedule by the cloud-based server may be automatically downloaded (e.g. mirrored) to the intelligent gateway. Likewise, updates to the event log of the intelligent gateway may be automatically uploaded (e.g. mirrored) to the cloud-based server. In some cases, the cloud-based server may be configured to receive user input from trained personnel to generate the site configuration for the building site. In some instances, the cloud-based server may implement a site configuration tool as described above.

FIG. 6 is a flow diagram showing an illustrative method 110 of remotely configuring a plurality of building system components at a building site. The plurality of building system components include a plurality of local controllers that are configured to control operation of the plurality of building system components that are operably coupled with an intelligent gateway disposed at the building site that is itself operably coupled with a cloud-based server via one or more networks. Information identifying the plurality of building system components discovered by the intelligent gateway is received at the cloud-based server, as indicated at block 92. The cloud-based server uses the received identifying information for the plurality of building system components to generate a site configuration for the building site that includes respective local configurations for each of two or more of the local controllers, as indicated at block 94. The site configuration is downloaded from the cloud-based server to the intelligent gateway, wherein the intelligent gateway is configured to download the local configurations of the site configuration to each of the respective two or more local controllers, as indicated at block 96.

In some cases, as optionally indicated at block 98, the intelligent gateway may collect operational data associated with the building site. The cloud-based server may receive at least some of the collected operational data from the intelligent gateway, as optionally indicated at block 100. The cloud-based server may update the site configuration based at least in part on the received operational data, resulting in an updated site configuration with one or more updated local configurations, as optionally indicated at block 112. The updated site configuration may be downloaded (e.g. mirrored) from the cloud-based server to the intelligent gateway, as optionally indicated at block 114. The intelligent gateway may download the one or more updated local configurations of the updated site configuration to the respective local controllers, as optionally indicated at block 116. In some cases, the updated site configuration may include one or more of updated control logic, updating modeling and/or updated configuration settings. In some cases, the cloud-based server may update the site configuration using machine learning.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of remotely configuring one or more building system components at a building site using a cloud-based server remote from the building site, the one or more building system components operably coupled with an intelligent gateway disposed at the building site that is itself operably coupled with the cloud-based server via a network, the method comprising:
receiving, at the cloud-based server from the intelligent gateway, information identifying each of the one or more building system components;
using the cloud-based server to create a site configuration residing on the cloud-based server that is based at least in part on the identified information for each of the one or more building system components; and
downloading the site configuration from the cloud-based server to the intelligent gateway such that the intelligent gateway is able to pass configuration information to one or more local controllers that control operation of the one or more building system components, wherein the cloud-based server is configured to bi-directionally communicate with the intelligent gateway and to:
maintain a mirror image of at least one of the site configuration and operational data between the cloud-based server and the intelligent gateway such that when a change is made to the at least one of the site configuration on the cloud-based server and the operational data on the intelligent gateway, that change is automatically mirrored to the at least one of the intelligent gateway and the cloud-based server.

2. The method of claim 1, further comprising:
using the cloud-based server to subsequently make changes to the site configuration residing on the cloud-based server; and
updating the site configuration stored on the intelligent gateway with the changes such that the intelligent gateway is able to pass the changes to the one or more local controllers.

3. The method of claim 1, wherein the information identifying each of the one or more building system components is discovered by the intelligent gateway.

4. The method of claim 1, further comprising:
receiving, at the cloud-based server from the intelligent gateway, operational data for at least some of the one or more building system components.

5. The method of claim 4, wherein the cloud-based server issues one or more alarm conditions in response to the received operational data.

6. The method of claim 4, wherein the cloud-based server generates one or more operational changes in response to the received operational data, and the one or more generated operational changes are implemented within the site configuration residing on the cloud-based server and are subsequently downloaded to the intelligent gateway for distribution to the one or more local controllers.

7. The method of claim 1, wherein the cloud-based server implements a site configuration tool for use by a user to help configure one or more of the local controllers when generating the site configuration.

8. The method of claim 7, wherein the site configuration tool is configured to permit the user to connect with the intelligent gateway in order to configure connections between each of the one or more local controllers and additional components.

9. The method of claim 7, wherein the site configuration tool is further configured to permit the user to discover additional components operably coupled to a particular one of the one or more local controllers and to configure control logic that can be used by the particular one of the one or more local controllers to work with the additional components.

10. The method of claim 9, wherein the additional components include one or more of a sensor and an actuator.

11. The method of claim 7, wherein the site configuration tool is further configured to permit the user to perform data modeling using operational data for at least some of the one or more building system components received from the intelligent gateway in order to define one or more of: spatial hierarchies, equipment models, entity models, relationships between spaces and connected entities, and relationships between connected entities.

12. The method of claim 7, wherein the site configuration tool is further configured to permit the user to configure one or more of: alarm limits on points, history collections and operational schedules for one of the one or more local controllers.

13. The method of claim 1, wherein the cloud-based server is configured to download software to the intelligent gateway that, when executed by the intelligent gateway, enables the intelligent gateway to communicate with the one or more of the local controllers.

14. A system comprising:
a processor configured to:
receive, at a cloud-based server from an intelligent gateway, information identifying each of one or more building system components;
use the cloud-based server to create a site configuration residing on the cloud-based server that is based at least in part on the identified information for each of the one or more building system components; and
download the site configuration from the cloud-based server to the intelligent gateway such that the intelligent gateway is able to pass configuration information to one or more local controllers that control operation of the one or more building system components, wherein the cloud-based server is configured to bi-directionally communicate with the intelligent gateway and to:
maintain a mirror image of at least one of the site configuration and operational data between the cloud-based server and the intelligent gateway such that when a change is made to the at least one of the site configuration on the cloud-based server and the operational data on the intelligent gateway, that change is automatically mirrored to the at least one of the intelligent gateway and the cloud-based server.

15. The system of claim 14, wherein system includes a site configuration tool.

16. The system of claim 15, wherein the site configuration tool is configured to permit a user initially commission the system for operation.

17. The system of claim 15, wherein the site configuration tool is configured to enable user to communicate with the intelligent gateway, and once in communication with the intelligent gateway, communicate with the local controllers via the intelligent gateway.

18. A non-transitory, computer-readable storage medium having stored thereon executable instructions that, when executed by one or more processors of a cloud-based server, cause the one or more processors of the cloud-based server to:
receive, at the cloud-based server from an intelligent gateway that is located at a building site remote from the cloud-based server, information identifying each of one or more building system components at the building site along with operational data for at least some of the one or more building system components;
generate a site configuration and store the site configuration on the cloud-based server;
download the site configuration to the intelligent gateway, wherein the intelligent gateway is configured to pass configuration information to one or more local controllers that control operation of at least some of the one or more building system components, wherein the cloud-based server is configured to bi-directionally communicate with the intelligent gateway and to:
maintain a mirror image of at least one of the site configuration and operational data between the cloud-based server and the intelligent gateway such that when a change is made to the at least one of the site configuration on the cloud-based server and the operational data on the intelligent gateway, that change is automatically mirrored to the at least one of the intelligent gateway and the cloud-based server.

19. The non-transitory, computer-readable storage medium of claim 18, wherein the executable instructions cause the cloud-based server to provide a site configuration tool by which a user remote from the building site is able to originally commission the building site.

20. The non-transitory, computer-readable storage medium of claim 19, wherein the site configuration tool is configured to permit the user to connect with the intelligent gateway in order to configure connections between each of the one or more local controllers and additional components.

* * * * *